United States Patent [19]

Sparkes

[11] 4,317,431

[45] Mar. 2, 1982

[54] ANIMAL FOOTBATH

[76] Inventor: Clifford S. J. Sparkes, Landshire Farm, Chilton Polden, Bridgwater, Somerset, TA7 9DS, England

[21] Appl. No.: 166,365

[22] Filed: Jul. 7, 1980

[51] Int. Cl.³ .............................................. A01K 29/00
[52] U.S. Cl. ......................................... 119/158; 4/622
[58] Field of Search ................ 119/158, 156, 1; 4/622

[56] References Cited

U.S. PATENT DOCUMENTS 1,238,349  8/1917  Shreve ................................ 119/156
2,312,524  3/1943  Cox ......................................... 4/622

FOREIGN PATENT DOCUMENTS 1921004  11/1970  Fed. Rep. of Germany .......... 4/622
1222078  2/1971  United Kingdom ..................... 4/622

Primary Examiner—Jay N. Eskovitz
Attorney, Agent, or Firm—Larson and Taylor

[57] ABSTRACT

An animal footbath comprises a trough (10) along which the animals pass and a perforate inner floor (24) raised above the bottom of the trough so that muck from the animals' feet falls through and is not stirred up by the hooves. Also it reduces spillage and splashing. The perforate floor slopes downwardly on either side (26) of a central line so that the hooves are spread as the animal proceeds.

8 Claims, 2 Drawing Figures

ANIMAL FOOTBATH

This invention relates to animal footbaths.

Such footbaths are usually in the form of a trough containing foot treatment liquid and along which the animals are driven. One of the problems in use is that the animals bring a good deal of dirt, debris and detritus, which fouls the treatment liquid and penetrates the animals' hooves along with the liquid. Another problem is that the animals tend to churn up the liquid, creating spillage and splashing, which can be wasteful and dangerous.

The invention provides an animal footbath comprising an elongate open-topped liquid container for animals to walk through, and having a perforate floor at least in part raised above the base of the container so as to allow a space below the floor for bath liquid and detritus.

Preferably the container is elongate in one direction, and a central portion of the floor in the direction of elongation is raised with respect to the lateral portions. In a preferred arrangement the base of the container has an upstanding median rib extending in the longitudinal direction of the container which supports the central portion of the perforate floor, lateral portions of the floor sloping downwardly from the central rib to be supported by the walls or base at the sides of the container. The perforate floor is conveniently made from expanded metal sheet.

In order that the invention may be more clearly understood, one embodiment will now be described with reference to the accompanying drawings, wherein.

Figure 1:
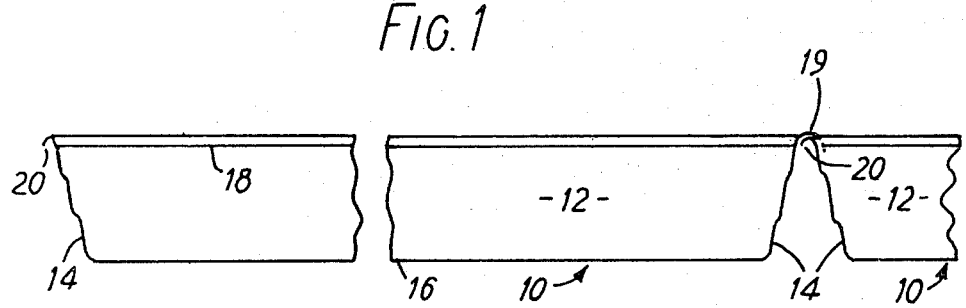
FIG. 1 shows a diagrammatic side view of a footbath.
Figure 2:
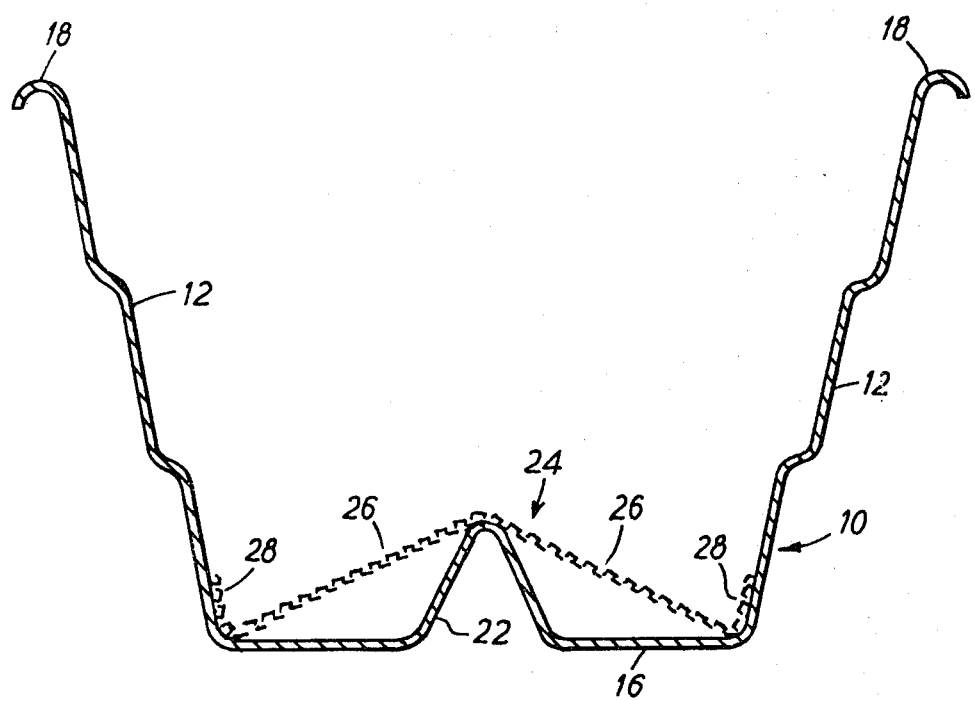
FIG. 2 shows a diagrammatic transverse cross-sectional view through the footbath.

Referring to the drawings, a footbath comprises a trough 10, which may for example be moulded in low density polyethylene or other plastics material or glass fibre reinforced resin, having stepped side walls 12 and end walls 14, and a base 16, the walls being upwardly divergent to an open top. The trough is elongate in one direction, being for example 275 cm long overall and having a width which is 40 cm at the open top and 23 cm at the base 16. A suitable height for the walls is 24 cm from base to rim. At the rim the side walls 12 are outturned in downwardly opening semi-circular form 18 and can be fitted over the horizontal bars of hurdles on either side of the footbath, while the rim at the end walls 14 are similarly shaped at 19 and 20 respectively, the dimension of the rim channel 19 at one end being a little larger than that of the rim channel 20 at the other end so that two baths can be fitted end to end, as shown in FIG. 1, with the rim 19 of one bath fitting over the rim 20 of the other, and thereby interlocking them.

The floor 16 of the trough is formed with a median rib 22 of inverted V cross-section extending lengthwise of the bath, and suitably of about 5 cm height. A perforate floor 24 is suitably made of expanded metal. It is of shallow W cross-section, having two main panels 26 sloping downwardly from a centre line at an angle of from 10° to 45° from the horizontal, and terminating in two upstanding flanges 28. The centre line region of the floor is supported on the rib 22, and the main panels 26 slope downwardly therefrom to the angle between the side walls 12 and the base 16, the flanges 28 lying against the inside surfaces of the side walls 12 so that the floor material does not cut into the side walls.

In use, foot treatment liquid is put into the bath to a level above the top-most part of the floor 24, and animals such as sheep are caused to enter the bath from one end and walk along the bath to emerge at the other end. In so doing, their feet are subjected to the treatment liquid, and bearing upon the sloping surfaces 26 their hooves are spread to assist the entry and penetration of the liquid. The perforate character of the floor 26 allows detritus from the animals hooves to fall through, and reduces the extent to which the animal stirs up such waste material as it walks along the footbath. Also since the animal only contacts the upper region of the liquid, there is less spillage and splashing.

The foregoing dimensions are suitable for a footbath for sheep. For other animals the dimensions may be altered accordingly.

Instead of turning the rims 18 outwards, they could be turned inwards to reduce the risk of spillage of liquid.

The perforated floor 24 need not be turned up at its edges 28, but for example the edges of the panels 26 could be covered with a split tube or have a round rod welded to the edge to prevent the floor material from cutting into the plastics material of the trough.

The perforate floor could be upwardly curved over its central cross-section rather than a shallow inverted V. Also, the perforate floor need not rest on the median rib, but be located some way above it if made of sufficiently rigid material. This gives more space underneath. The median rib would act as a stop if undue pressure depressed the perforate floor, but the rib could be dispensed with entirely unless useful for stiffening the trough.

I claim:

1. An animal footbath for cloven-hoofed animals comprising: an elongate open-topped liquid container for the animals to walk through, said liquid container having a perforate floor of a relatively coarse mesh to allow detritus from the animals' hooves to pass therethrough, said perforate floor being relatively immovably fixed in said liquid container and raised above the base of said container so as to allow a space below said perforate floor for bath liquid and accumulated detritus, said perforate floor further having a transverse cross section which slopes downwards from a central region so that the animals' feet bear on the sloping surfaces on either side of the central region as the animals pass along the footbath.

2. Animal footbath according to claim 1 wherein the sides of the container are upwardly divergent, so that containers of a number of footbaths can be nested together for transport and storage.

3. Animal footbath according to claim 1 wherein said transverse cross-section of the perforate floor comprises a shallow inverted V profile, said central region lying at the apex of the V.

4. Animal footbath according to claim 1 wherein the floor of the container has a raised median rib extending lengthwise of the footbath under the perforate floor.

5. Animal footbath according to claim 4 wherein the median rib engages the underside of the perforate floor.

6. Animal footbath according to claim 1 wherein the rim of the container at the ends is out-turned in downwardly opening channel form, the channel at one end being a little larger than that at the other end so that two similar baths can be fitted end-to-end with the smaller end rim channel of one bath received in the larger end rim channel of the other bath.

7. Animal footbath according to claim 1 wherein the rim of the container at the sides is out-turned in downwardly opening channel form so that the channels can fit over horizontal bars of hurdles on either side of the footbath.

8. A method of treating cloven hooved animals' feet comprising the steps of causing the animals to walk through a footbath containing a foot treatment liquid;

supporting the animals' feet on a perforate floor which is raised above the bottom of the bath but is located below the level of the treatment liquid, the perforate floor being relatively immovably fixed in the bath;

opening the hooves of the animals to the treatment liquid with the perforate floor on which the animals' feet bear as they walk through the footbath by providing the perforate floor with a transverse cross section which slopes downwardly from a central region for this purpose; and accumulating the detritus from the animals' feet below the perforate floor which is of a coarse mesh which allows the detritus to fall through the perforations.

* * * * *